(12) United States Patent
Kovishaner

(10) Patent No.: US 11,010,293 B1
(45) Date of Patent: May 18, 2021

(54) REGISTER-BASED ASYNCHRONOUS FIFO WITH ASYMMETRIC SIZE

(71) Applicant: Marvell Israel (M.I.S.L.) Ltd., Yokne'am (IL)

(72) Inventor: Gregory Kovishaner, Ramat-Gan (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 261 days.

(21) Appl. No.: 16/174,918

(22) Filed: Oct. 30, 2018

Related U.S. Application Data

(60) Provisional application No. 62/620,942, filed on Jan. 23, 2018.

(51) Int. Cl.
*G06F 12/0804* (2016.01)
*G06F 12/0862* (2016.01)

(52) U.S. Cl.
CPC ...... *G06F 12/0804* (2013.01); *G06F 12/0862* (2013.01); *G06F 2212/1032* (2013.01); *G06F 2212/602* (2013.01)

(58) Field of Classification Search
CPC ......... G06F 5/10; G06F 5/14; G06F 2205/102
USPC ........................................................ 711/137
See application file for complete search history.

(56) References Cited

U.S. PATENT DOCUMENTS

| | | | | |
|---|---|---|---|---|
| 5,084,841 A | * | 1/1992 | Williams | G06F 5/12 341/98 |
| 5,426,756 A | * | 6/1995 | Shyi | G06F 5/14 365/189.07 |
| 6,337,893 B1 | * | 1/2002 | Pontius | G06F 5/14 377/108 |
| 6,937,172 B1 | * | 8/2005 | Lowe | G06F 5/14 341/97 |
| 7,254,677 B1 | * | 8/2007 | Lowe | G06F 5/10 710/52 |
| 2003/0177295 A1 | * | 9/2003 | Hsu | G06F 5/14 710/200 |
| 2010/0306426 A1 | * | 12/2010 | Boonstra | G06F 5/12 710/57 |

* cited by examiner

*Primary Examiner* — Titus Wong

(57) ABSTRACT

Implementations described herein provide apparatus and methods for storing data in, and retrieving data from, an asynchronous FIFO. Data is received at a write side receiving circuitry residing in a write-side clock domain of the FIFO and stored at a memory location in a data storage buffer having a plurality of locations. Each memory location in the data storage buffer has a binary pointer value corresponding to the respective location. The binary pointer value is converted to a corresponding Gray code symbol and transferred to the read side of the FIFO. At the read side the Gray code symbol is converted back to the corresponding binary pointer value. Read-side control circuitry, using the binary pointer value, transfers the data from the data storage buffer to a data output register residing in a read-side clock domain of the FIFO.

20 Claims, 3 Drawing Sheets

REGISTER-BASED ASYNCHRONOUS FIFO WITH ASYMMETRIC SIZE

CROSS-REFERENCE TO RELATED APPLICATION

This claims the benefit under 35 U.S.C. § 119(e) of U.S. Provisional Patent Application No. 62/620,942, filed Jan. 23, 2018, which is hereby incorporated by reference herein in its entirety.

FIELD OF USE

This disclosure relates to storage of data in, and retrieval of data from, an asynchronous FIFO.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

During integration of a two-clock first-in-first-out register-based (FIFO) component in a higher level design of a chip, an arbitrary number of balanced buffers may be automatically added by back-end tools to each data line outgoing from the FIFO, for pipelining and other reasons, thereby adding a random amount of delay to the timing path of each data bit between a data source located inside the FIFO and a data destination register(s) situated in the design out of the FIFO. These delays can be easily miscalculated, overlooked, or otherwise improperly accounted for when integrating the FIFO in the higher-level design, making it difficult to close timing, thereby potentially requiring modification of the chip design and re-fabrication of the chip.

SUMMARY

Implementations described herein provide an apparatus and methods for storing data in, and retrieving data from, an asynchronous FIFO. Data is received at a write side receiving circuitry residing in a write-side clock domain of the FIFO and stored at a memory location in a data storage buffer having a plurality of locations. Each memory location in the data storage buffer has a binary pointer value corresponding to the respective location. The binary pointer value is converted to a corresponding Gray code symbol and transferred to the read side of the FIFO. At the read side the Gray code symbol is converted back to the corresponding binary pointer value. Read-side control circuitry, using the binary pointer value, transfers the data from the data storage buffer to a data output register residing in a read-side clock domain of the FIFO.

The read-side control circuitry determines whether the data output register is full. If the data output register is full, the read-side control circuitry asserts a not-empty signal. If the data output register is not full, the read-side control circuitry pre-fetches data from the data storage buffer and transfers the pre-fetched data to the data output register.

Write-side control circuitry records pointer values corresponding to full locations of the data storage buffer in a write-side used-words register. The write-side control circuitry transmits a signal indicating the recorded pointer values to external components from which data is received by the FIFO. Write-side control circuitry receives, from an external component, a write-enable signal and, in response to the write-enable signal, determines a pointer value corresponding to an empty location of the data storage buffer. Write-side control circuitry then updates the write-side used-words register to indicate the location corresponding to the determined pointer value has been filled.

Similarly, the read-side control circuitry records pointer values corresponding to full locations of the data storage buffer in a read-side used-words register and transmits to external components a signal indicating the recorded pointer values to external components by which data is retrieved from the FIFO. Read-side control circuitry receives, from an external component, a read-enable signal and, in response to receiving the read-enable signal, determines a pointer value corresponding to a full location of the data storage buffer. Read-side control circuitry then updates the read-side used-words register to indicate that the location corresponding to the pointer value has been emptied.

The data storage buffer normally has an even number of locations. The number of locations visible to external components on the read side is one more than the number of locations of the data storage buffer. The additional location corresponds to the data output register.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
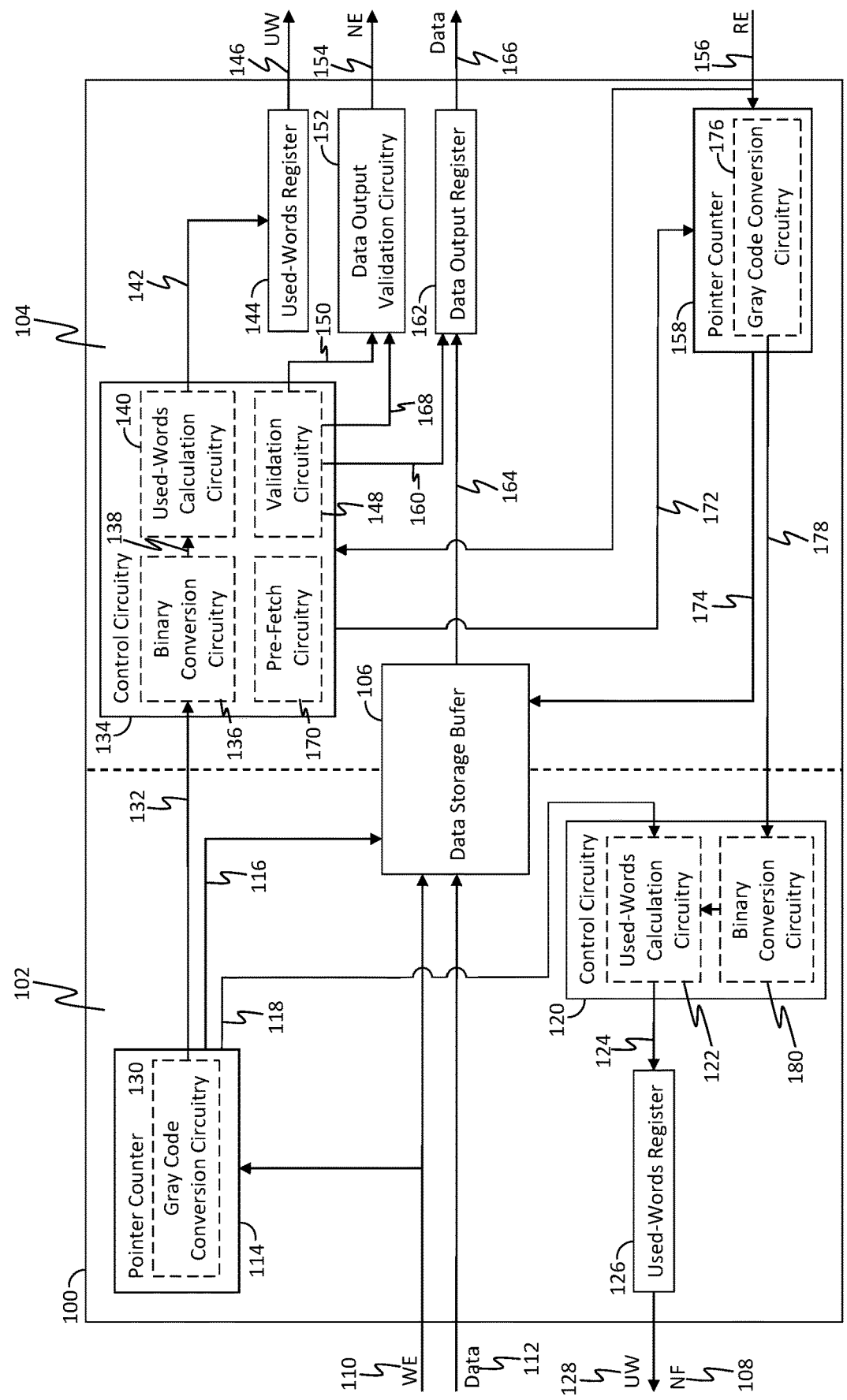
FIG. 1 is a block diagram illustrating components of a FIFO and data flow therebetween for writing data to, and reading data from, the FIFO register array in accordance with some implementations of the subject matter of the present disclosure.

Typical register-based asynchronous FIFOs include a data storage buffer, which includes several data registers, and data output multiplexer. The data output multiplexer is used to read data from a given location (i.e., register) within the data storage buffer. Data is passed through the multiplexer and transmitted to external components.

Typical asynchronous FIFOs are logically divided into two sides, with the operations of each side being governed by a different clock with a different clock pulse rate. One side, at which data is written into the FIFO, is designated as the write side while the other side, at which data is read out of the FIFO, is designated as the read side. The data storage buffer is accessible by both sides, allowing for transport of data from the write side to the read side. A write-to-read control channel conveys information about the data (e.g., the number of words that have been loaded into the data storage buffer) from the write side to the read side. A binary write pointer is converted, at the write side, into a corresponding Gray code symbol and is conveyed to the read side via a write-to-read clock synchronization channel. The gray code is then converted back to the corresponding binary value at the read side. The read side includes a used-words register that indicates the number of used words (i.e., filled locations within the data storage buffer) available to be read. This used-words register is updated based on the write pointer received at the read side.

Similarly, a read-to-write control channel conveys information about data read from the data storage buffer from the read side to the write side. A binary read pointer is converted at the read side to a corresponding gray code symbol and is conveyed to the write side via a read-to-write clock synchronization channel. The gray code is then converted back to the corresponding binary value at the write side, and is used to update a second used-words register that indicates the number of unused words (i.e., empty locations within the data storage buffer) available, to which data can be written.

On the basis of the value of the used-words register on the write side, the FIFO may assert a not-full signal, indicating that at least one location is empty and can be written to. Similarly, on the basis of the value of the used-words register on the read side, the FIFO may assert a not-empty signal, indication that at least one location is full and can be read from.

However when the FIFO is integrated in a higher level design, timing problems can occur because back-end tools automatically insert an arbitrary number of balanced buffers per bit of the data bus outgoing from the FIFO towards external destination register(s) and thereby add random delay to timing paths of each such data bit. Because the data bus is crossing different clock domains, the timing path from source registers to destination registers is not closed (i.e., fixed) by the back-end tools. Thus, an external component may receive the wrong data from the data storage buffer or no data at all.

Implementations of the subject matter of the present disclosure reduce or prevent timing errors between a FIFO and external components attempting to read data from the FIFO. Specifically, the subject matter of the present disclosure provides a way to limit timing errors to those occurring within the FIFO itself which can be addressed using significantly less complicated timing constraints. Thus, the back-end problem is resolved by modifying the design of a traditional two-clock register-based FIFO. Specifically, an additional data output register is included in the FIFO from which all external components read data. The data output register is an additional location of the FIFO that is only visible at the read-side. The addition of the data output register does not add any latency to the data path through the FIFO, because the data is loaded into the data output register along with assertion of the not-empty signal. Any timing problems are limited to the FIFO itself, and timing constraints can be employed within the FIFO to compensate for such timing problems. This allows critical timing issues to be resolved in the early stages of the chip design process and eliminates the need to create complicated dependencies in timing constraints involving multiple components.

FIG. 1 is a block diagram illustrating components of an asynchronous FIFO 100 and data flow therebetween for writing data to, and reading data from, the FIFO, according to some implementations described herein. FIFO 100 is logically divided into a write side 102 and a read side 104. Write side 102 includes write-side pointer counter 114, write-side control circuitry 120, and write-side used-words register 126, each of which resides in a write-side clock domain. Read side 104 includes read-side control circuitry 134, read-side used-words register 144, data output valida-tion circuitry 152, read-side pointer counter 158, and data output register 162, each of which resides in a read-side clock domain. Data storage buffer 106 is accessible from both sides and serves to transport data from write side 102 to read side 104. Data storage buffer 106 normally has an even number of locations at which data can be stored. Upon assertion of a not-full signal 108 by FIFO 100, external components may write data to the FIFO 100. A write-enable signal 110 is received, and data 112 is transmitted to the FIFO 100 to be stored in the data storage buffer 106. Write-enable signal 110 informs data storage buffer 106 of the incoming data 112. Write-enable signal 110 also informs write pointer counter 114 of the incoming data. Write pointer counter 114 transfers 116 a pointer value corresponding to a location of the data storage buffer 106 at which the incoming data 112 should be written to data storage buffer 106. Write pointer counter 114 also transmits 118 the pointer value to write side control circuitry 120. Write side control circuitry 120, using write-side used-words calculation circuitry 122, determines which words within the data storage buffer are in use (i.e., full) and transmits 124 identifiers of the used words to write-side used-words register 126. Write-side used-words register 126 transmits an indicator of the used words 128 to external components as well as the not-full signal 108.

Once the data 112 is stored in the data storage buffer 106, write pointer counter 114, using write-side Gray code circuitry 130, converts the pointer value to a Gray code symbol, as described below. The Gray code symbol corresponding to the pointer value is transferred 132 to read side 104, where it is received by read-side control circuitry 134. Read-side control circuitry 134, using read-side binary conversion circuitry 136, converts the Gray code symbol back to the corresponding binary pointer value. Read-side binary conversion circuitry 136 transfers 138 the pointer value to read-side used-words calculation circuitry 140 which, similar to write-side used-words calculation circuitry 122, determines which words within the data storage buffer 106 are in use. Read-side used-words calculation circuitry 140 transfers 142 identifiers of the used words to read-side used words-register 144. Read-side used-words register 144 transmits 146 an indicator of the used words to external components. The number of locations of the FIFO visible to external components on the read side is one greater than the number of locations of the data storage buffer 106 to account for the data output register 162. In other words, data output register 162 is treated as an additional location, and a pointer value may correspond to the data output register 162.

In response to receiving the Gray code symbol, read-side control circuitry 134 determines that data has been stored in the data storage buffer 106. Read-side control circuitry 134, using validation circuitry 148, transmits 150 a signal to data output validation circuitry 152. Data output validation circuitry 152 asserts a not-empty signal 154, indicating to external components that data is available to be read from the data storage buffer 106.

In response to detecting the not-empty signal 154, an external component may transmit a read-enable signal 156. Read-enable signal 156 informs read pointer counter 158 of an incoming request to read data from data storage buffer 106. Read-enable signal 156 also informs read-side control circuitry 134 of the incoming read request. Read-side control circuitry 134, using read-side used-words calculation circuitry 140, determines which data is to be retrieved. Read-side used-words calculation circuitry 140 transmits 160 a pointer of the data to be retrieved to data output register 162. Data output register 162 retrieves 164 the appropriate data from data storage buffer 106. The retrieved data is then output 166 from the data output register.

After data is read out from the data output register 162, read-side control circuitry 134, using validation circuitry 148 transmits 168 a command to data output validation circuitry 152 to stop asserting the not-empty signal 154. Read-side control circuitry 134, using prefetch circuitry 170, then loads data at the next full location into the data output register 162. Prefetch circuitry 170 transmits 172 a signal to read pointer counter 158 to determine a pointer for the next full location. Read pointer counter 158 transfers 174 the pointer to data storage buffer 106. Data storage buffer 106 then transfers 164 the data form the indicated location to the data output register 162. Read pointer counter 158 also converts the value of the pointer corresponding to the data read out from the data output register 162 to a corresponding Gray code symbol using read-side Gray code conversion circuitry 176. The Gray code symbol is transferred from the read side 104 to the write side 102, where it is received by write-side control circuitry 120. Write-side control circuitry 120, using write-side binary conversion circuitry 180, converts the Gray code symbol to the corresponding binary pointer value. Write-side control circuitry 120, using write-side used-words calculation circuitry 122, removes the word corresponding to the pointer from the indicator of used words 128, as that location may now be overwritten.

The Gray code is a sequence of symbols in which the value of a respective symbol changes by only one bit from the respective value of the immediately preceding symbol. For example, the number 1 is represented as a 4-bit binary value is 0001 and the number 2 is represented as 0010. Progressing from 1 to 2 using binary values results in changing two bits. The Gray code, however, changes only a single bit between consecutive values. Thus, while the Gray code representation of the number 1 is still 0001, the Gray code representation of the number 2 is 0011. The Gray code includes an even number of symbols arranged in a sequence. The most significant bit of each symbol of the first half of the sequence is 0, and the most significant bit of each symbol in the second half of the sequence is 1. The remaining bits of the first symbol of the sequence are identical to the remaining bits of the last symbol of the sequence. The remaining bits of each successive (i.e., from first to last) symbol of the first half of the sequence are also identical to the remaining bits of each regressive (i.e., from last to first) symbol of the second half of the sequence. For example, in a 10-symbol sequence with each symbol being four bits in length, the last three bits of the first and tenth symbols have the same values. The last three bits of the second and ninth symbols also have the same values. This pattern continues for each symbol in equidistant positions from each end of the sequence.

Figure 2:
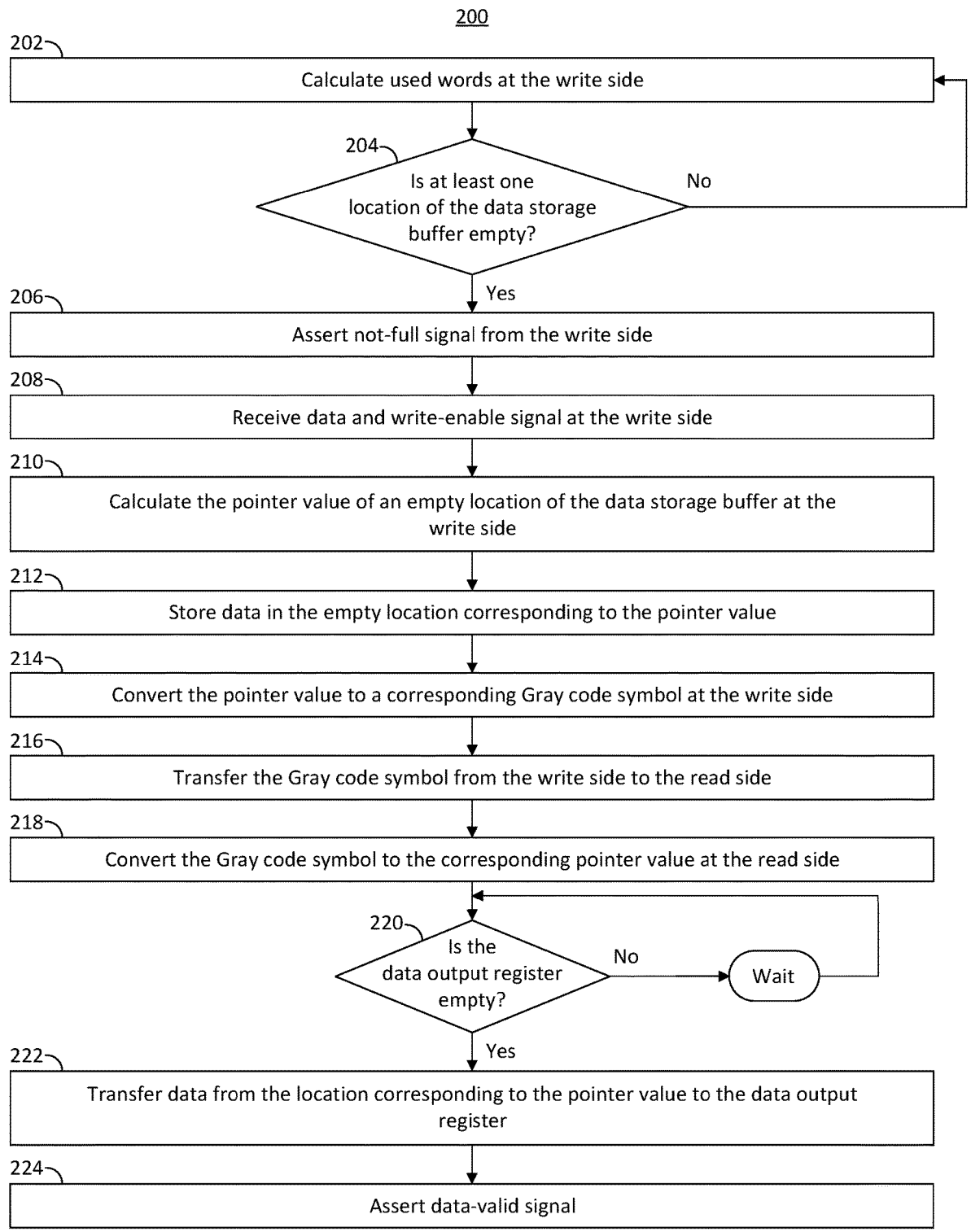
FIG. 2 is a flowchart representing a process for receiving and storing data in a data storage buffer of the FIFO register array in accordance with some implementations of the subject matter of the present disclosure.

FIG. 2 is a flowchart representing a process 200 for receiving and storing data in a data storage buffer of the FIFO, according to some embodiments disclosed herein. At 202, write-side control circuitry 120, using write-side used-words calculation circuitry 122, calculates the used words at the write side. For example, write-side used-words calculation circuitry 122 may query the data storage buffer 106 to determine if any location of the data storage buffer 106 is full. Alternatively, write-side used-words calculation circuitry 122 may access write-side used word register 126 to retrieve indications of full locations within the data storage buffer 106.

At 204, write-side control circuitry 120 determines whether at least one location of the data storage buffer 106 is empty. For example, write-side control circuitry 120 compares the used words calculated at 202 with a list of all locations within the data storage buffer 106. Alternatively, write-side control circuitry 120 compares the total number of used words calculated at 202 with a known total number of locations within the data storage buffer 106. Write-side control circuitry 120 updates write-side used-words register 126. If there are no empty locations within the data storage buffer 106, processing returns to 202.

If write-side control circuitry 120 determines that at least one location of the data storage buffer 106 is empty, then, at 206, write-side used-words register 126 asserts a not-full signal. For example, write-side used-words register 126 applies a constant or pulsed voltage to an output pin on the FIFO chip. The not-full signal indicates to external components that data may be written to the FIFO.

At 208, FIFO 100 receives write-enable signal 110 and data 112. For example, FIFO 100 detects a voltage change on a pin of the FIFO chip indicative of the write-enable signal. FIFO 100 detects, at another pin, a pulsed voltage signal encoding the data 112 to be stored in the data storage buffer 106. At 210, in response to receiving the write-enable signal 110, write-side pointer counter 114 calculates a pointer value of an empty location of the data storage buffer 106. For example, data may be stored in locations of the data storage buffer in known sequence. Write-side pointer counter 114 increments the last-used pointer value by one to determine a pointer value of an empty location. If the incremented pointer value exceeds the number of locations, write-side pointer counter 114 sets the pointer value to 0.

At 212, FIFO 100 stores the data 112 in the empty location corresponding to the pointer value calculated at 210. At 214, write-side pointer counter 114, using write-side Gray code conversion circuitry 130, converts the pointer value from a binary value to a corresponding Gray code symbol. Write-side pointer counter 114 then, at 216, transfers the Gray code symbol from the write side to the read side, where it is received by read-side control circuitry 134.

At 218, read-side control circuitry 134, using read-side binary conversion circuitry 136, converts the Gray code symbol to the corresponding binary pointer value. At 220, read-side control circuitry 134 determines whether the data output register 162 is empty. If the data output register is empty, then, at 222, the data 112 is transferred from the location of the data storage buffer 106 corresponding to the pointer value to the data output register 162. For example, red-side control circuitry 134, using validation circuitry 148, instructs the data output register 162 to retrieve the data 112 from the data storage buffer 106. Validation circuitry 148 then, at 224, instructs data output validation circuitry 152 to assert a not-empty signal, which may be similar to the not-full signal described above and inform external components that data is available to be read from the FIFO 100.

Figure 3:
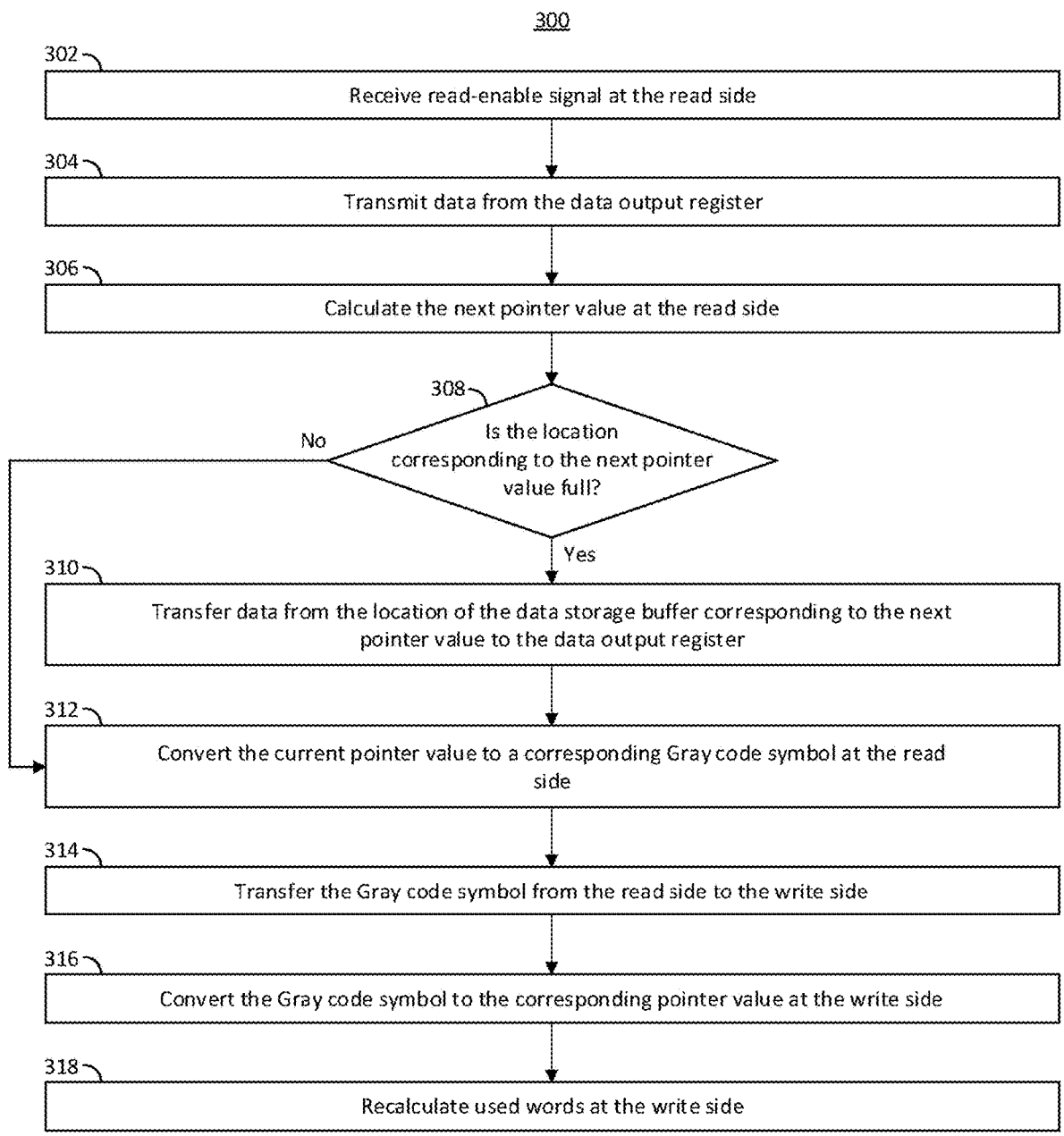
FIG. 3 is a flowchart representing a process for reading data out of the FIFO register array in accordance with some implementations of the subject matter of the present disclosure.

FIG. 3 is a flowchart representing a process for reading data out of the FIFO, according to some embodiments disclosed herein. At 302, FIFO 100 receives a read-enable signal. For example, FIFO 100 detects a voltage change on a pin of the FIFO chip. At 304, data output register 162 transmits data stored in data output register 162 to an external component. For example, data output register 162 generates, on a pin of the FIFO chip, a pulsed voltage signal encoding the data. The signal may be detected or otherwise received by the external component.

At 306, read-side pointer counter 158 calculates the next pointer value at the read side. For example, read-side pointer counter 158 increments the current pointer value by one to determine the next pointer value. If the incremented pointer value exceeds the number of locations in the data storage buffer 106, read-side pointer counter 158 sets the pointer value to 0.

At 308, FIFO 100 determines, using read-side used-words register 144, whether the location of the data storage buffer 106 corresponding to the next pointer value is full. For example, read-side used-words register 144 compares the next pointer value with the recorded full locations to determine if the next pointer value corresponds to a full location. If the next pointer value does not correspond to a full location, processing proceeds to step 312. If the next pointer value corresponds to a full location of the data storage buffer 106, then, at 310, FIFO 100 transfers data from the location of the data storage buffer 106 corresponding to the next pointer value to the data output register 162.

At 312, read-side pointer counter 158 converts the current binary pointer value to a corresponding Gray code symbol and, at 314, transfers the Gray code symbol to the write side 102. The Gray code symbol is received by write-side control circuitry 120 and, at 316, write-side control circuitry 120, using write-side binary conversion circuitry 180, converts the Gray code symbol to the corresponding binary pointer value.

At 318, write-side control circuitry 120, using write-side used-words calculation circuitry 122, recalculates the used words at the write side. Write-side used-words calculation circuitry 122 removes the converted pointer value from the used words to reflect that the data stored in the location of the data storage buffer 106 corresponding to the converted pointer value has been read out of the FIFO 100. This enables new data to be written to the location.

Various implementations discussed in conjunction with FIGS. 1-3 are performed by various electronic components of one or more electronic circuits, such as but not limited to an integrated circuit, and application-specific integrated circuit (ASIC), a digital signal processor (DSP), and/or the like. Various components discussed throughout this disclosure are configured to include a set of electronic circuit components, and communicatively operate on one or more electronic circuits. Each electronic circuit is configured to include any of, but not limited to logic gates, memory cells, amplifiers, filters, and/or the like. Various implementations and components disclosed herein may be configured to be at least partially operated and/or implemented by processor-executable instructions stored on one or more transitory or non-transitory processor-readable media.

While various implementations of the subject matter of the present disclosure have been shown and described herein, such implementations are provided by way of example only. Numerous variations, changes, and substitutions relating to implementations described herein are applicable without departing from the disclosure. It is noted that various alternatives to the implementations of the disclosure described herein may be employed in practicing the disclosure. It is intended that the following claims define the scope of the disclosure and that methods and structures within the scope of these claims and their equivalents be covered thereby.

While operations are depicted in the drawings in a particular order, that is not to be construed as requiring that such operations be performed in the particular order shown or in sequential order, or that all illustrated operations must be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 2 does not necessarily require the particular order shown, or sequential order, to achieve desirable results. In certain implementations, multitasking and parallel processing may be advantageous. Other variations are within the scope of the following claims.

What is claimed is:

1. An asynchronous first-in-first-out data register (FIFO), the asynchronous FIFO comprising:
   write-side control circuitry residing in a write-side clock domain and configured to:
      receive data from a first external component,
      store the data at a memory location in a data storage buffer having a plurality of memory locations, the memory location in the data storage buffer having a binary pointer value corresponding to the location, and
      convert the binary pointer value to a corresponding Gray code symbol; and
   read-side control circuitry residing in a read-side clock domain and configured to:
      convert the Gray code symbol to the corresponding binary pointer value, and
      transfer the data from the memory location in the data storage buffer to a data output register, different from the plurality of memory locations in the data storage buffer, residing within the read-side clock domain to be read by a second external component.

2. The asynchronous FIFO of claim 1, wherein the read-side control circuitry is further configured to:
   determine that the data output register is full; and
   in response to determining that the data output register is full, assert a not-empty signal.

3. The asynchronous FIFO of claim 1, wherein the read-side control circuitry is further configured to:
   prefetch data from a full location of the data storage buffer; and
   transfer the prefetched data to the data output register.

4. The asynchronous FIFO of claim 1, further comprising:
   a write-side used-words register configured to:
      record pointer values corresponding to full locations of the data storage buffer; and
      transmit a signal indicating the recorded pointer values to external components from which data is received by the asynchronous FIFO.

5. The asynchronous FIFO of claim 4, wherein the write-side control circuitry is further configured to:
   receive, from the first external component, a write-enable signal;
   in response to receiving the write-enable signal, determine a write-side pointer value corresponding to an empty location of the data storage buffer; and
   update the write-side used-words register.

6. The asynchronous FIFO of claim 1, further comprising:
   a read-side used-words register configured to:
      record pointer values corresponding to full locations of the data storage buffer; and
      transmit a signal indicating the recorded pointer values to external components by which data is retrieved from the asynchronous FIFO.

7. The asynchronous FIFO of claim 6, wherein the read-side control circuitry is further configured to:
   receive, from the second external component, a read-enable signal;

in response to receiving the read-enable signal, determine a read-side pointer value corresponding to a full location of the data storage buffer; and
update the read-side used-words register.

8. The asynchronous FIFO of claim 1, wherein the data storage buffer comprises an even number of locations.

9. The asynchronous FIFO of claim 8, wherein the number of locations visible to external components on the read side is an odd number that is one more than the number of locations of the data storage buffer.

10. The asynchronous FIFO of claim 1, wherein the Gray code comprises a sequence of symbols in which the value of a respective symbol changes by only one bit from the respective value of an immediately preceding symbol, wherein the most significant bit of each symbol is a toggling bit which divides the set of symbols into two subsets, and wherein the remaining bits of a first symbol of a first subset are the same as the remaining bits of a last symbol of a second subset, with the remaining bits of each successive symbol of the first subset being the same as each regressive symbol of the second subset.

11. A method of storing data in, and retrieving data from, an asynchronous first-in-first-out data register (FIFO), the method comprising:
receiving, at write-side receiving circuitry residing in a write-side clock domain, data from a first external component;
storing the data at a memory location in a data storage buffer having a plurality of memory locations, the memory location in the data storage buffer having a binary pointer value corresponding to the location;
converting, at the write-side, the write-side binary pointer value to a corresponding Gray code symbol;
transferring the Gray code symbol from the write side to a read side;
converting, at read-side conversion circuitry residing in a read-sided clock domain, the Gray code symbol to a corresponding read-side binary pointer value; and
transferring the data from the memory location in the data storage buffer to a data output register, different from the plurality of memory locations in the data storage buffer, residing within the read-side clock domain to be read by a second external component.

12. The method of claim 11, further comprising:
determining that the data output register is full; and
in response to determining that the data output register is full, asserting a not-empty signal.

13. The method of claim 11, further comprising:
prefetching data from a full location of the data storage buffer; and
transferring the prefetched data to the data output register.

14. The method of claim 11, further comprising:
recording, at the write side, pointer values corresponding to full locations of the data storage buffer in a write-side used-words register; and
transmitting a signal indicating the recorded pointer values to external components from which data is received by the asynchronous FIFO.

15. The method of claim 14, further comprising:
receiving, from the first external component, a write-enable signal;
in response to receiving the write-enable signal, determining a write-side pointer value corresponding to an empty location of the data storage buffer; and
updating the write-side used-words register.

16. The method of claim 11, further comprising:
recording, at the read side, pointer values corresponding to full locations of the data storage buffer in a read-side used-words register; and
transmitting a signal indicating the recorded pointer values to external components by which data is retrieved from the asynchronous FIFO.

17. The method of claim 16, further comprising:
receiving, from the second external component, a read-enable signal;
in response to receiving the read-enable signal, determining a read-side pointer value corresponding to a full location of the data storage buffer; and
updating the read-side used-words register.

18. The method of claim 11, wherein the data storage buffer comprises an even number of locations.

19. The method of claim 18, wherein the number of locations visible to external components on the read side is an odd number that is one more than the number of locations on the data storage buffer.

20. The method of claim 11, wherein the Gray code comprised a sequence of symbols in which the value of a respective symbol changes by only one bit from the respective value of an immediately preceding symbol, wherein the most significant bit of each symbol is a toggling bit which divides the symbols into two subsets, and wherein the remaining bits of a first symbol of a first subset are the same as the remaining bits of a last symbol of a second subset, with the remaining bits of each successive symbol in the first subset being the same as each regressive symbol of the second subset.

* * * * *